United States Patent [19]

Bianco

[11] Patent Number: 5,239,726
[45] Date of Patent: Aug. 31, 1993

[54] WINDSHIELD WASHER NOZZLE ASSEMBLY RETENTION BRACKET AND HOOK PLATE

[75] Inventor: Michael A. Bianco, Valparaiso, Ind.

[73] Assignee: Cooper Industries, Inc., Houston, Tex.

[21] Appl. No.: 864,816

[22] Filed: Apr. 3, 1992

[51] Int. Cl.5 ............................................. B60S 1/32
[52] U.S. Cl. ............................. 15/250.04; 15/250.35; 15/250.31
[58] Field of Search ........... 15/250.04, 250.35, 250.01, 15/250.02, 250.03, 250.31, 250.34

[56] References Cited

U.S. PATENT DOCUMENTS

| | | | |
|---|---|---|---|
| 3,440,679 | 4/1969 | Druseikis | 15/290.04 |
| 3,548,442 | 12/1970 | Stratton | 15/250.35 |
| 3,827,101 | 8/1974 | Wubbe | 15/250.04 |
| 3,940,068 | 2/1976 | Mobnach et al. | 15/250.04 |
| 4,581,786 | 4/1986 | Brummer et al. | 15/250.35 |
| 4,718,139 | 1/1988 | Okuda et al. | 15/250.34 |

FOREIGN PATENT DOCUMENTS

| | | | |
|---|---|---|---|
| 0289658 | 11/1988 | European Pat. Off. | 15/250.35 |
| 2942086 | 4/1981 | Fed. Rep. of Germany | 15/250.04 |
| 2047079 | 11/1980 | United Kingdom | 15/250.04 |

*Primary Examiner*—Harvey C. Hornsby
*Assistant Examiner*—Gary K. Graham
*Attorney, Agent, or Firm*—Alan R. Thiele; Eddie E. Scott; William B. Patterson

[57] ABSTRACT

An improved hook plate for a windshield wiper arm includes a first end portion for attachment to biasing spring, a central portion for mounting the hook plate to a wiper arm and a second end portion for mounting a windshield washer jet assembly.

1 Claim, 3 Drawing Sheets

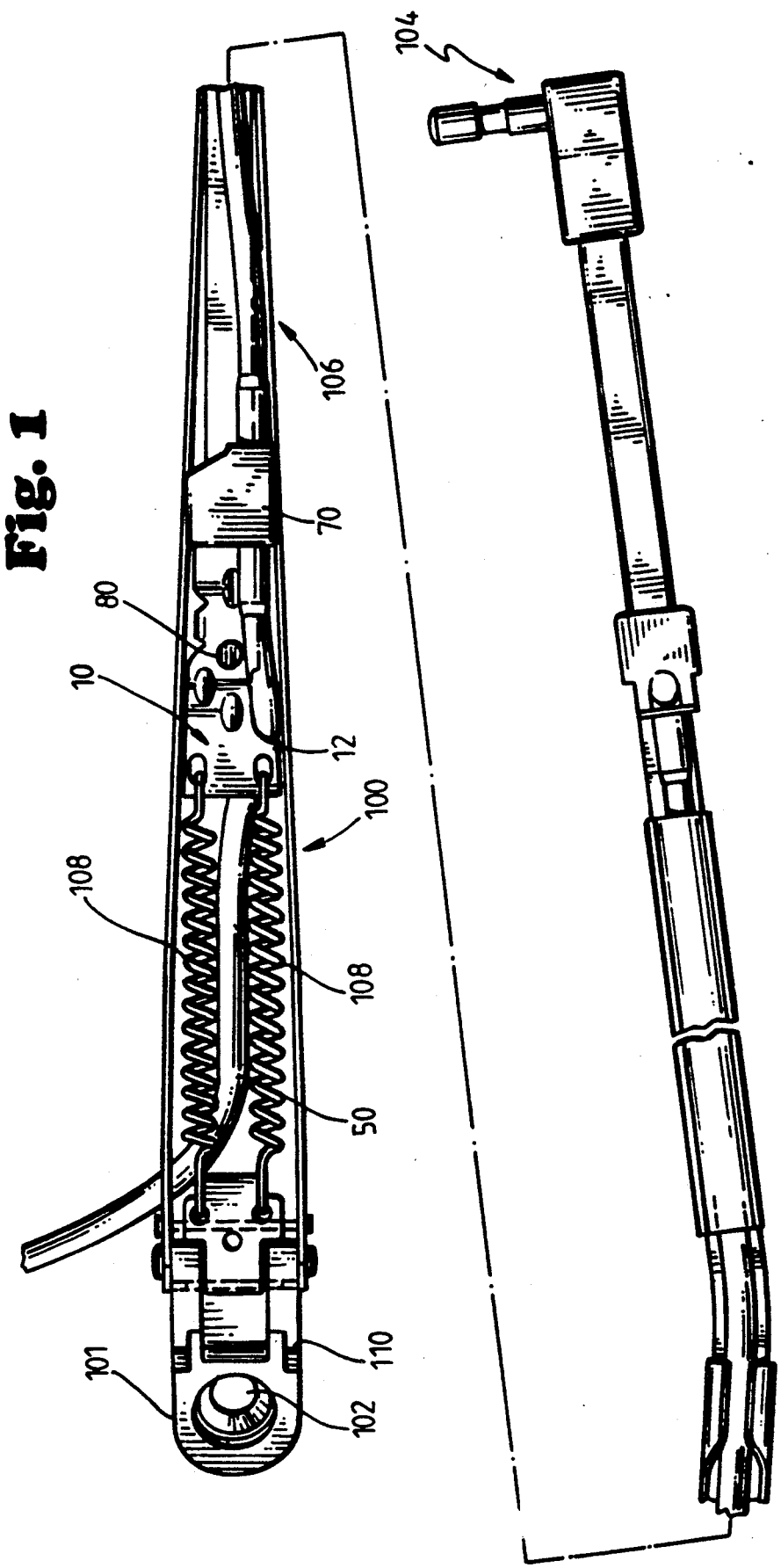

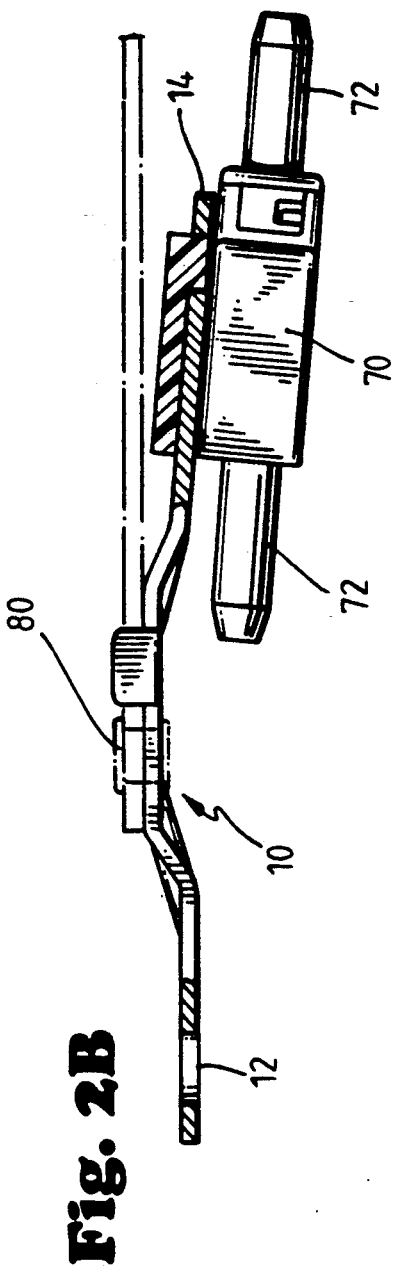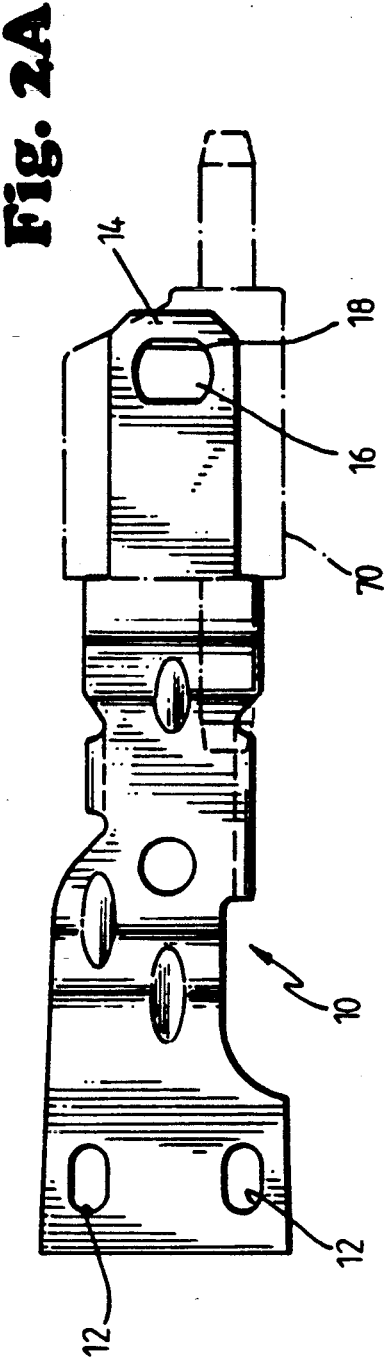

WINDSHIELD WASHER NOZZLE ASSEMBLY RETENTION BRACKET AND HOOK PLATE

BACKGROUND OF THE INVENTION

The present invention pertains to windshield wiper arm assemblies; more particularly, the present invention pertains to windshield wiper arm assemblies which carry on board washer fluid spray nozzles.

Several decades ago, windshield washer systems were added to automobiles to spray liquid on windshields. These systems facilitated the removal of dirt from automobile windshields as the wiper blades moved across the windshield. Washer spray nozzles for these wiper systems were typically mounted within the automobile cowling at the base of the windshield. It was found that while such windshield washer assemblies were effective, an improved assembly could be made by mounting one or more washer spray nozzles along the length of the windshield wiper arm assembly. With this construction, the spray is placed just where it is needed; where the wiper blade contacts the windshield. To accomplish this task, a flexible hose assembly is run along the windshield wiper arm assembly. One or more nozzles are mounted along the length of the flexible hose assembly for spraying washer fluid on the windshield.

In prior art windshield wiper arm assemblies the spray nozzle located near the lower portion of the windshield washer arm assembly required a separate mounting bracket. This separate mounting bracket allowed the washer spray nozzle to be knocked off in conditions where snow was packed on the automobile; thus, defeating its purpose. Additionally, it was found that the separate mounting of the nozzle produced non-repeatable spray patterns. Because of these problems, there is perceived a need in the art to provide a system for secure mounting of the lower washer spray nozzle assembly to a windshield wiper arm assembly wherein such mounting provides repeatable spray patterns.

SUMMARY OF THE INVENTION

The windshield washer spray nozzle assembly retention bracket and hook plate of the present invention provides for secure mounting of the lower washer spray nozzle assembly to a windshield wiper arm assembly wherein repeatable spray patterns result.

An improved windshield washer spray nozzle assembly retention bracket and hook plate for a windshield wiper arm includes a first end portion for attachment to the wiper arm biasing mechanism, a central portion for mounting the hook plate to a wiper arm and a second end portion for mounting a washer spray nozzle assembly.

BRIEF DESCRIPTION OF THE FIGURES

A better understanding of the improved windshield washer nozzle assembly retention bracket and hook plate of the present invention may be had by reference to the figures wherein:

FIG. 1 is a plan view of the underside of windshield wiper arm typically used on automobiles;

FIGS. 2A and 2B are top and side views respectively of the hook plate of the present invention;

DESCRIPTION OF THE EMBODIMENTS

Figure 3A:
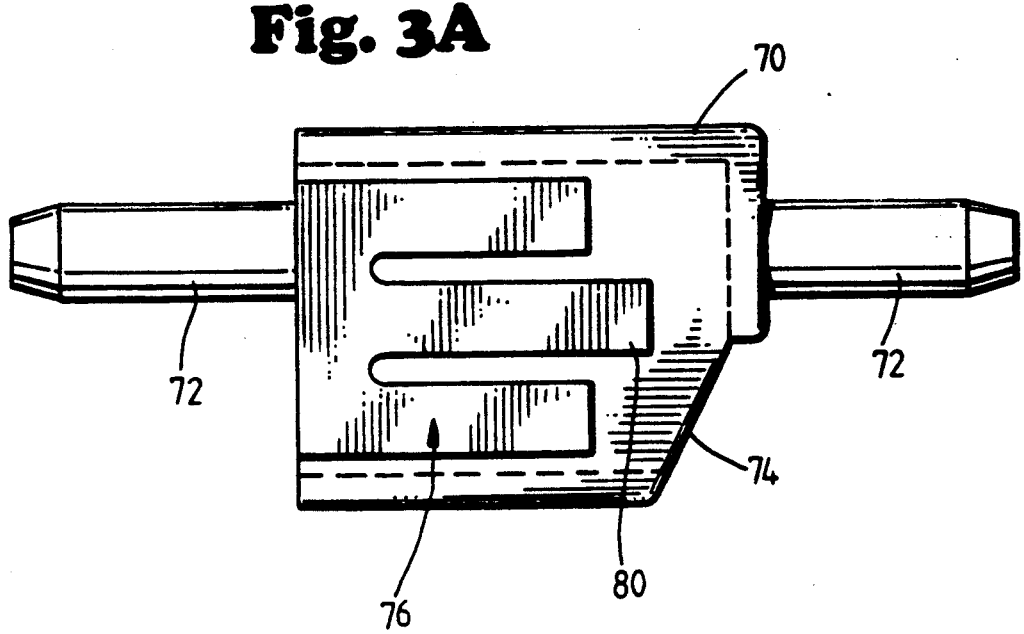
FIGS. 3A and 3B are top and end views of the flow-through washer spray nozzle used on a windshield wiper dismantled from the hook plate of the present invention.

The hook plate 10 of the present invention is found on the underside of the windshield wiper arm assemblies 100 as shown in FIG. 1. Therein it may be seen that the windshield wiper arm assembly 100 includes a press fit cylindrical hole 102 at one end which allows for connecting the windshield wiper arm assembly 100 to intermittent rotational force. The intermittent rotational force causes the windshield wiper arm assembly 100 to move back and forth across a windshield (not shown).

At the opposite end of the windshield wiper arm assembly is a configuration 104 for mounting the rubber wiper blade portion 103 (not shown) and spreaders 105 (not shown) found on a typical windshield wiper. Together, this is called the windshield wiper blade assembly 100. Between cylindrical hole 102 and the mounting configuration for the wiper blade assembly is a central structural assembly 106.

The central structural assembly 106 typically includes a plurality of springs 108 which provide the force necessary to hold the windshield wiper blade assembly 100 against the windshield of an automobile. Such springs 108 are retained in place by being attached to a bracket extending from the connector 110 which contains cylindrical hole 102 to one end 12 of hook plate 10.

Figure 3B:
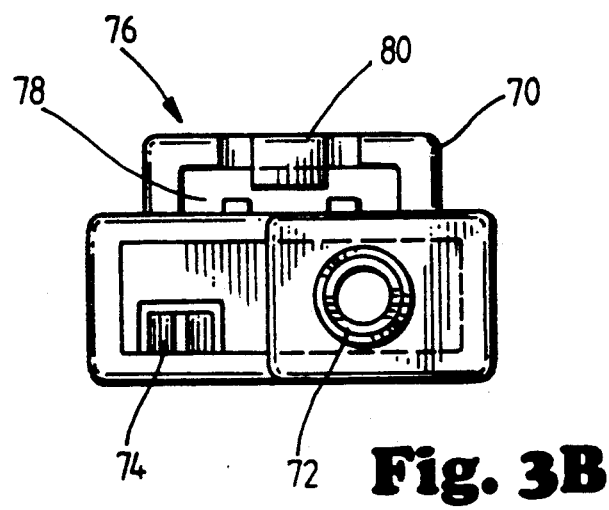

In many cars, the spray from an on board spraying system goes onto the windshield by means of a fixed nozzle mounted in the cowling at the base of the windshield. In newer cars, the liquid to be sprayed is carried through a hose 50 affixed to the underside of windshield wiper arm assembly 100. At various locations along the length of hose 50 are spray nozzles 70 (FIGS. 3A and 3B). These spray nozzles 70 emit washer fluid onto the windshield to soften the dirt which accumulates on the surface of the windshield, thus making the job easier for wiper blade.

When it has been desired to mount windshield washer nozzles 70 near the base of windshield wiper arm assembly 100, it has been necessary to add separate holding devices to the windshield wiper arm assembly to hold the windshield washer nozzles in place. The present invention eliminates this necessity. As may be seen in FIGS. 2A and 2B, the windshield wiper nozzle 70 is mounted to a tongue 14 which extends from the end of the hook plate 10 opposite that portion 12 of the hook plate 10 which attaches to the springs 108 underneath the windshield wiper arm assembly 100. The hole 16 in the tongue 14 provides for secure mounting of the windshield washer nozzle 70 to the hook plate 10. The hook plate 10 of the present invention may be attached to the central channel portion 106 of the windshield wiper arm assembly 100 by riveting 80 as shown in the preferred embodiment or if desired, welding or some type of sonic bonding may be used.

The sprayer assembly 70 shown in FIGS. 3A and 3B includes two mounting extensions 72 located on either end. Fluid passing through tubing 50 exits the sprayer assembly at face 74. To assure mounting of sprayer assembly 70 to the improved hook plate 10, a groove assembly 76 is formed on the top side of the sprayer assembly 70.

Mounting the sprayer assembly 70 to the improved hook plate 10 of the present invention is accomplished by inserting tongue 14 into groove 78 and assuring that tab 82 extends through hole 16.

There is thereby provided by the improved hook plate 10 of the present invention a system for both mounting the springs 108 on a windshield wiper arm assembly 100 and a method of mounting a windshield washer jet assembly 70.

The foregoing describes what the inventor believes is the preferred embodiment of the invention. It will be understood by those of ordinary skill in the art that still other embodiments of this invention may be made based on the foregoing disclosure. Such other embodiment shall fall within the scope of the present invention.

I claim:

1. An improved hook plate for a windshield wiper arm assembly, including a windshield washer sprayer which moves with the windshield wiper arm assembly, said improved hook plate comprising:
   a first end portion;
   a second end portion;
   a central portion between said first and second end portions;
   said first end portion of the hook plate including at least one hole for mechanical interconnection with wiper arm biasing springs;
   said central portion of the hook plate including means for attachment to the windshield wiper arm assembly;
   said second end portion of the hook plate including a tongue portion having means for mounting said windshield washer sprayer.

* * * * *